United States Patent
Vo et al.

(10) Patent No.: US 10,787,143 B2
(45) Date of Patent: Sep. 29, 2020

(54) LINCHPIN VERIFICATION

(71) Applicant: Ford Global Technologies, LLC, Dearborn, MI (US)

(72) Inventors: Jeffrey Tien Vo, Candler, NC (US); Brian Robert Spahn, Plymouth, MI (US); Timothy Owen Hamlin, Warren, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 80 days.

(21) Appl. No.: 16/013,026

(22) Filed: Jun. 20, 2018

(65) Prior Publication Data

US 2019/0389413 A1 Dec. 26, 2019

(51) Int. Cl.
*B60R 21/207* (2006.01)
*G06K 19/06* (2006.01)
*B60N 2/42* (2006.01)

(52) U.S. Cl.
CPC .............. *B60R 21/207* (2013.01); *B60N 2/42* (2013.01); *G06K 19/06037* (2013.01)

(58) Field of Classification Search
CPC ........ B60R 21/207; B60R 2021/23146; B60N 2/42; G06K 19/06009; G06K 19/06018; G06K 19/06028; G06K 19/06037
See application file for complete search history.

(56) References Cited

U.S. PATENT DOCUMENTS

| | | | |
|---|---|---|---|
| 5,547,214 A | 8/1996 | Zimmerman, II et al. | |
| 5,927,749 A * | 7/1999 | Homier | B60N 2/5883 280/728.3 |
| 6,209,906 B1 * | 4/2001 | DeWitt | B60H 1/34 280/728.2 |
| 6,231,068 B1 * | 5/2001 | White, Jr. | B60R 21/207 280/728.2 |
| 6,439,597 B1 * | 8/2002 | Harada | B60R 21/207 280/728.2 |
| 7,222,875 B2 * | 5/2007 | Meyendorff | B60R 21/20 280/728.2 |
| 7,677,598 B1 * | 3/2010 | Ryan | B60R 21/18 280/730.2 |
| 8,220,832 B2 * | 7/2012 | Muller | B60R 21/201 280/730.2 |
| 8,459,695 B2 * | 6/2013 | Spencer | B60R 21/231 24/573.09 |
| 8,523,221 B2 * | 9/2013 | Muller | B60R 21/201 280/730.2 |
| 8,602,449 B2 * | 12/2013 | Kojima | B60R 21/207 280/730.2 |
| 8,820,780 B2 | 9/2014 | Thomas | |
| 9,062,696 B2 * | 6/2015 | Demerath | B60R 13/0206 |
| 9,242,615 B2 * | 1/2016 | Adams | B60R 21/232 |
| 9,267,525 B2 | 2/2016 | Everard | |

(Continued)

*Primary Examiner* — Laura Freedman
(74) *Attorney, Agent, or Firm* — Frank A. MacKenzie; Bejin Bieneman PLC (57) ABSTRACT

An assembly includes a base. The assembly includes an airbag supported by the base. The assembly includes an airbag guide supported by the base. The assembly includes a linchpin securing the airbag guide to the base. The linchpin includes a first marking and one of the base or the airbag guide includes a second marking, the first marking and the second marking align to collectively be a readable indicium.

20 Claims, 7 Drawing Sheets

(56) References Cited

U.S. PATENT DOCUMENTS

| | | |
|---|---|---|
| 9,452,728 B2 | 9/2016 | Zimmermann et al. |
| 9,566,931 B2 | 2/2017 | Keer et al. |
| 2007/0145140 A1* | 6/2007 | Yoshimura .......... B60R 21/2171 235/462.01 |
| 2008/0258440 A1* | 10/2008 | Muller .................. B60R 21/207 280/728.3 |
| 2016/0011270 A1* | 1/2016 | Poirier .................. G01K 11/12 324/426 |
| 2017/0008476 A1 | 1/2017 | Knoebel et al. |

* cited by examiner

LINCHPIN VERIFICATION

BACKGROUND

An airbag assembly may contain multiple components and may be fixed to a vehicle, e.g., a seat of the vehicle. The components may be fixed to each other and/or to the vehicle with a linchpin or the like. Proper installation of the linchpin may difficult, e.g., access to the airbag assembly may be limited when the airbag assembly is fixed to the seat. Verification of proper linchpin installation may be beneficial.

DETAILED DESCRIPTION

An assembly includes a base. The assembly includes an airbag supported by the base. The assembly includes an airbag guide supported by the base. The assembly includes a linchpin securing the airbag guide to the base. The linchpin includes a first marking and one of the base or the airbag guide includes a second marking, the first marking and the second marking align to collectively be a readable indicium.

The readable indicium may be a barcode.

The linchpin may include a circumferential surface, and the first marking may be on the circumferential surface.

The linchpin may include a distal end and a surface on the distal end, and the first marking maybe on the surface of the distal end.

The second marking may define a window, and the first marking may be located in the window.

The first marking may include a first line, and the second marking may include a second line that is parallel to the first line.

The first marking may include a first line, and the second marking may include a second line and a third line spaced from the second line, the first line being between the second line and the third line.

The first line, the second line, and the third line may be parallel.

The linchpin, the base, and the airbag guide may each include an alignment surface, the alignment surfaces collectively positioning the linchpin, the base, and the airbag guide relative to each other.

The alignment surface of the linchpin may abut the alignment surfaces of the base and the airbag guide.

The linchpin may include a shaft and the alignment surface of the linchpin may be planar and elongated along the shaft.

The readable indicium may be visually readable.

The assembly may include a sleeve disposed between the linchpin and one of the base or the airbag guide.

The assembly may include a seat frame, the base may be fixed to the seat frame.

A method of installing an airbag assembly includes positioning an airbag guide relative to a base, one of the airbag guide or the base including a first marking. The method includes inserting a linchpin to fix the airbag guide to the base, the linchpin including a second marking. The method includes confirming the first marking is aligned with the second marking to collectively be a readable indicium.

Confirming the first marking is aligned with the second marking may include scanning a barcode as the readable indicium.

Confirming the first marking is aligned with the second marking may include confirming the first marking is parallel with the second marking.

Confirming the first marking is aligned with the second marking may include confirming the second marking is within a window defined by the first marking.

The method may include fixing the base to a seat frame before positioning the airbag guide relative to the base.

The method may include installing a covering over the seat frame, base, and airbag guide after confirming the first marking is aligned with the second marking.

Figure 6:
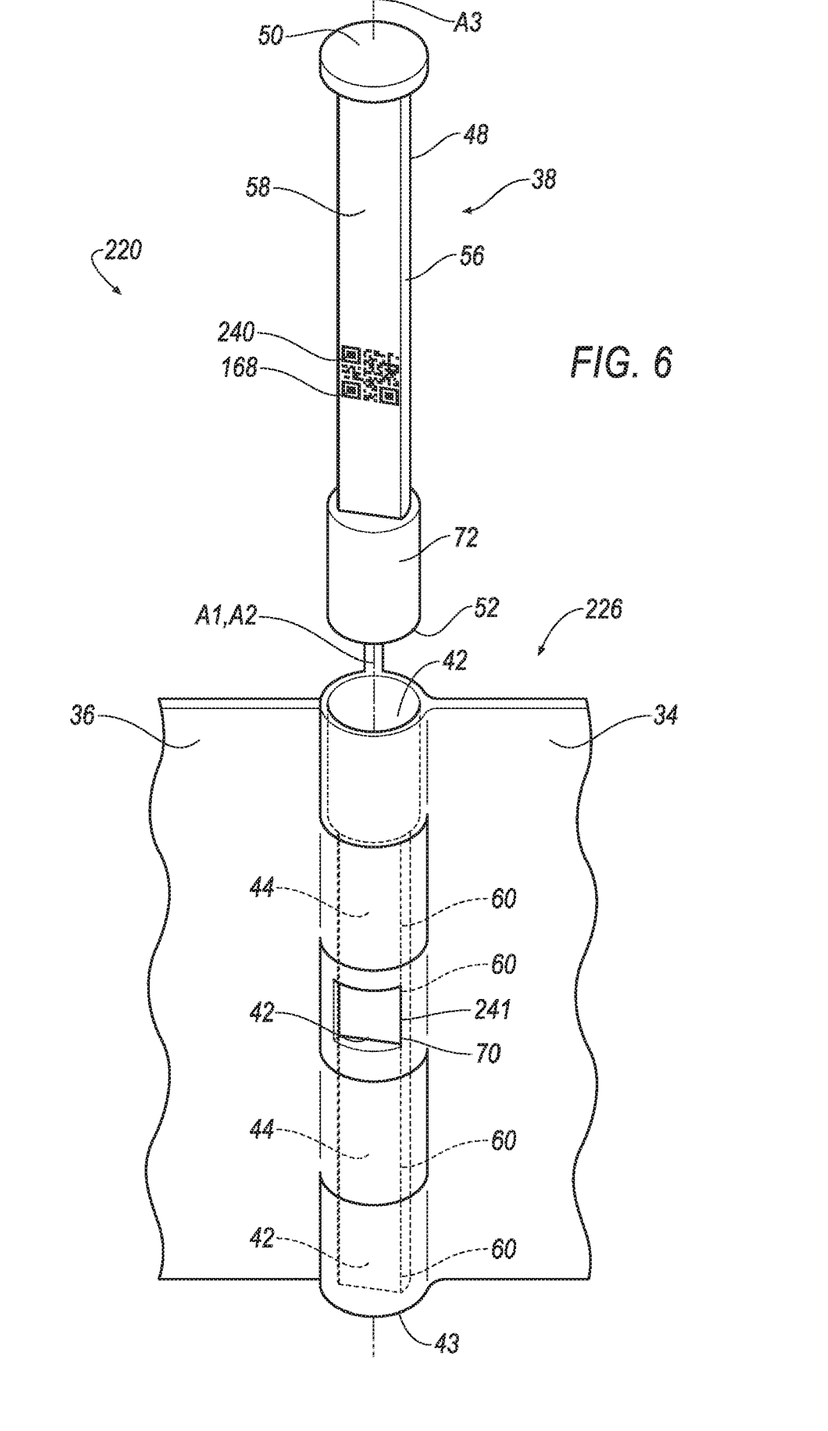
FIG. 6 is a perspective view of a portion of another embodiment of an airbag assembly and a linchpin prior to installation.
Figure 7:
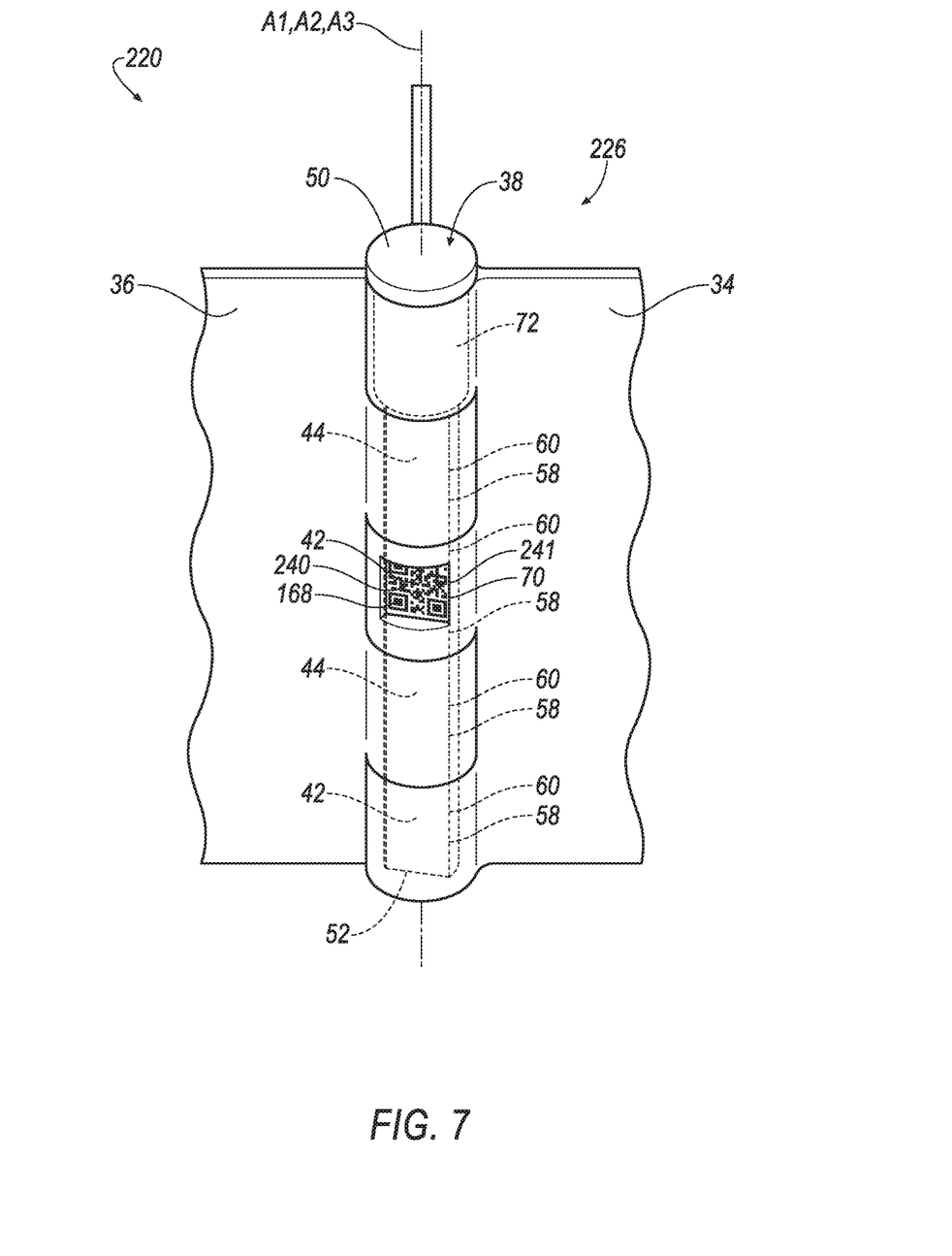
FIG. 7 is a perspective view of the portion of the airbag assembly and the linchpin of FIG. 6 after installation.

With reference to the Figures, wherein like numerals indicate like parts throughout the several views, an airbag assembly 20, 120, 220 for a vehicle includes an airbag 24 supported by a base 26, 126, 226, such as a housing 28, a frame 30 of a seat 32 of the vehicle, a bracket 34, etc. The airbag assembly 20, 120, 220 includes an airbag guide 36 supported by the base 26, 126, 226. The airbag assembly 20, 120, 220 includes a linchpin 38 securing the airbag guide 36 to the base 26, 126, 226. The linchpin 38 includes a first marking 40, 140, 240. The base 26, 126, 226 and/or the airbag guide 36 include a second marking 41, 141, 241. The first marking 40, 140, 240 and the second marking 41, 141, 241 align to collectively be a readable indicium 46. The readable indicium 46 enables inspection of the airbag assembly 20, 120, 220, e.g., to verify the linchpin 38 is properly installed and positioned relative to the base 26, 126, 226 and/or airbag guide 36. One embodiment of the assembly 20 is shown in FIG. 1-4, another embodiment of the assembly 120 is shown in FIG. 5, and a third embodiment of the assembly 220 is shown in FIGS. 6 and 7. The adjectives "first" and "second" are used throughout this document as identifiers and are not intended to signify importance or order.

The vehicle may be any passenger or commercial automobile such as a car, a truck, a sport utility vehicle, a crossover vehicle, a van, a minivan, a taxi, a bus, etc. The vehicle includes a passenger cabin to house occupants, if any, of the vehicle. The passenger cabin includes one or more seats 32 disposed in the passenger cabin. The seats 32 may be bucket seats, bench seats, or any other type. The position and orientation of the seats 32 and components thereof may be adjustable by an occupant.

Each seat 32 may include the frame 30. The frame 30 may include tubes, beams, etc. The frame 30 may be formed of any suitable plastic material, e.g., carbon fiber reinforced plastic (CFRP), glass fiber-reinforced semi-finished thermoplastic composite (organosheet), etc. As another example, some or all components of the frame 30 may be formed of a suitable metal, e.g., steel, aluminum, etc.

The seat 32 may include a covering 33 supported on the frame 30. The covering 33 may be formed of cloth, leather, faux leather, or any other suitable material.

The seat 32 may include padding 37. The padding 37 may be between the covering 33 and the frame 30. The padding 37 may be foam or any other suitable material. The covering 33 may be stitched in panels around the frame 30, the padding 37, etc.

The base 26, 126, 226 supports other components of the airbag assembly 20, 120, 220. For example, the base 26, 126, 226 may support the airbag 24. The base 26, 126, 226 may be the housing 28, the frame 30 of the seat 32, the bracket 34, or any suitable structure. The base 26, 126, 226, e.g., the bracket 34, the housing 28, etc., may be fixed to the frame 30 of the seat 32 or any suitable structure, e.g., with a fastener, etc.

The airbag 24 is deployable from an uninflated position to an inflated position during a vehicle impact to control kinematics of occupants inside the vehicle during the impact. The airbag 24 may be formed of a woven polymer or any other material. As one example, the airbag 24 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane. The airbag 24 may be supported by the base 26, 126, 226, e.g., via the housing 28.

An inflator 39 may be connected to the airbag 24. Upon receiving a signal from, e.g., a vehicle controller, the inflator 39 may inflate the airbag 24 with an inflatable medium, such as a gas. The inflator 39 may be, for example, a pyrotechnic inflator that uses a chemical reaction to drive inflation medium to the airbag 24. The inflator 39 may be of any suitable type, for example, a cold-gas inflator.

The inflator 39 and the airbag 24 in the uninflated position may be disposed in the housing 28. The housing 28 provides a reaction surface for the airbag 24 in the inflated position. The housing 28 may be supported by the seat 32, e.g., fixed to the frame 30 via the bracket 34, or at any other suitable location of the vehicle. The housing 28 may be formed of any suitable material, e.g., a rigid polymer, a metal, a composite, etc.

The housing 28 may be fixed to the frame 30 of the seat 32 with the bracket 34, e.g., one end of the bracket 34 may be fixed to the housing 28, e.g., via a fastener, welding, adhesive etc., and an opposite of the bracket 34 may be fixed to the frame 30. The bracket 34 may be metal of any of the suitable material. The bracket 34 and the housing 28 may be monolithic, i.e., a single piece of material with no seams, joints, fasteners, or adhesives holding the bracket 34 and the housing 28 together.

The airbag guide 36 directs the airbag 24 as it inflates to the inflated position. For example, normal forces generated between the airbag 24 and the airbag guide 36 while inflation medium is being provided from the inflator 39 may urge the airbag 24 in a seat-forward direction, upwardly relative to the seat 32, e.g., toward a roof of the vehicle, behind the seat 32, etc. The airbag guide 36 may be plastic or any suitable material. The airbag guide 36 is supported by the base 26, 126, 226. For example, the airbag guide 36 may be supported by the frame 30 via the bracket 34.

The linchpin 38 secures the airbag guide 36 to the base 26, 126, 226. For example, the bracket 34 may include one or more passages 42 and the airbag guide 36 may include one or more passages 44. The passages 44 of the airbag guide 36 and/or the passages 42 of the bracket 34 may define a first axis A1 and a second axis A2, respectively. The passages 42 of the bracket 34 may be aligned with the passages 44 of the airbag guide 36. For example, the first axis A1 may be aligned with the second axis A2. The linchpin 38 may extend through the passages 42, 44 and secure to the airbag guide 36 relative to the bracket 34. Although the passages 42 are described as part of the bracket 34, it is to be understood that passages could be included in other components of the base 26, 126, 226, such as the housing 28, the frame 30, etc., and could be structured and function as described herein.

The linchpin 38 may include a shaft 48. The shaft 48 may define a third axis A3. The shaft 48 may extend from a head 50 of the linchpin 38 to a distal end 52 along the third axis A3. The head 50 may be larger than the shaft 48, i.e., the head 50 may have a larger cross-sectional width perpendicular to the axis third A3 than the shaft 48. For example, a diameter of the shaft 48 may be smaller than a diameter of the head 50. The linchpin 38 may include a surface 54 on the distal end 52. The linchpin 38 may include a circumferential surface 56. The circumferential surface 56 may extend about the axis A3 and along the shaft 48 between the head 50 and the distal end 52.

The linchpin 38 may include an alignment surface 58. For example, the alignment surface 58 of the linchpin 38 may be planar and elongated along the shaft 48, e.g., between the head 50 and the distal end of the shaft 48. The alignment surface 58 may be a portion of the circumferential surface 56.

The base 26, 126, 226 and the airbag guide 36 may each include an alignment surface 60. For example, the alignment surfaces 60 may be planar in the passages 42, 44 and elongated along the respective axis A1, A2.

The alignment surface 58 of the linchpin 38, the alignment surface 60 of the of the base 26, 126, 226, and the alignment surface 60 of the airbag guide 36 help to position the base 26, 126, 226, the airbag guide 36, and the linchpin 38 relative to each other. For example, the alignment surface 60 of the linchpin 38 may abut the alignment surfaces 60 of the base 26, 126, 226 and the airbag guide 36. Such abutment restricts rotation, e.g., about the axes A1, A2, A3 of the linchpin 38, the base 26, 126, 226, and the airbag guide 36 relative to each other.

The linchpin 38 includes the marking 40, 140, 240. The base 26, 126, 226 and/or the airbag guide 36 include the marking 41, 141, 241. The markings 40, 140, 240, 41, 141, 241 are detectable, e.g., by a human, a visual sensor, a touch sensor, etc. The markings 40, 140, 240, 41, 141, 241 may be physical, e.g., a raised lip, a recessed groove, etc. The physical markings may be detected by a human and/or by a computer, e.g., based on information from a contact sensor or the like. The markings 40, 140, 240, 41, 141, 241 may be visual, e.g., a printing or the like of contrasting brightness, color, etc. The visual markings may be detected by a human and/by a computer, e.g., based on information from a camera, a bar-code reader, or the like.

The marking 40, 140, 240 of the linchpin 38 and the marking 41, 141, 241 of the airbag guide 36 and/or of the base 26, 126, 226 align to collectively be the readable indicium 46. The readable indicium 46 is a shape, character(s), symbol, etc., that is identifiable by a human or computer to identify that the linchpin 38 is properly inserted into the airbag guide 36 and/or base 26, 126, 226. The readable indicium 46 may be visually readable. The visually readable indicium 46 is identifiable by a human or computer as including certain information based on visual information detected by human eyesight, a camera, a bar-code reader, or the like. For example, the readable indicium 46 may be a barcode 68, 168. The barcode 68, 168 may be a linear barcode, a matrix barcode, etc. The barcode 68, 168 may be scannable by a computer when the linchpin 38 is properly inserted into the airbag guide 36 and/or base 26, 126, 226. The barcode 68, 168 may not be scannable when the linchpin 38 is not properly inserted into the airbag guide 36 and/or base 26, 126, 226.

Figure 1:
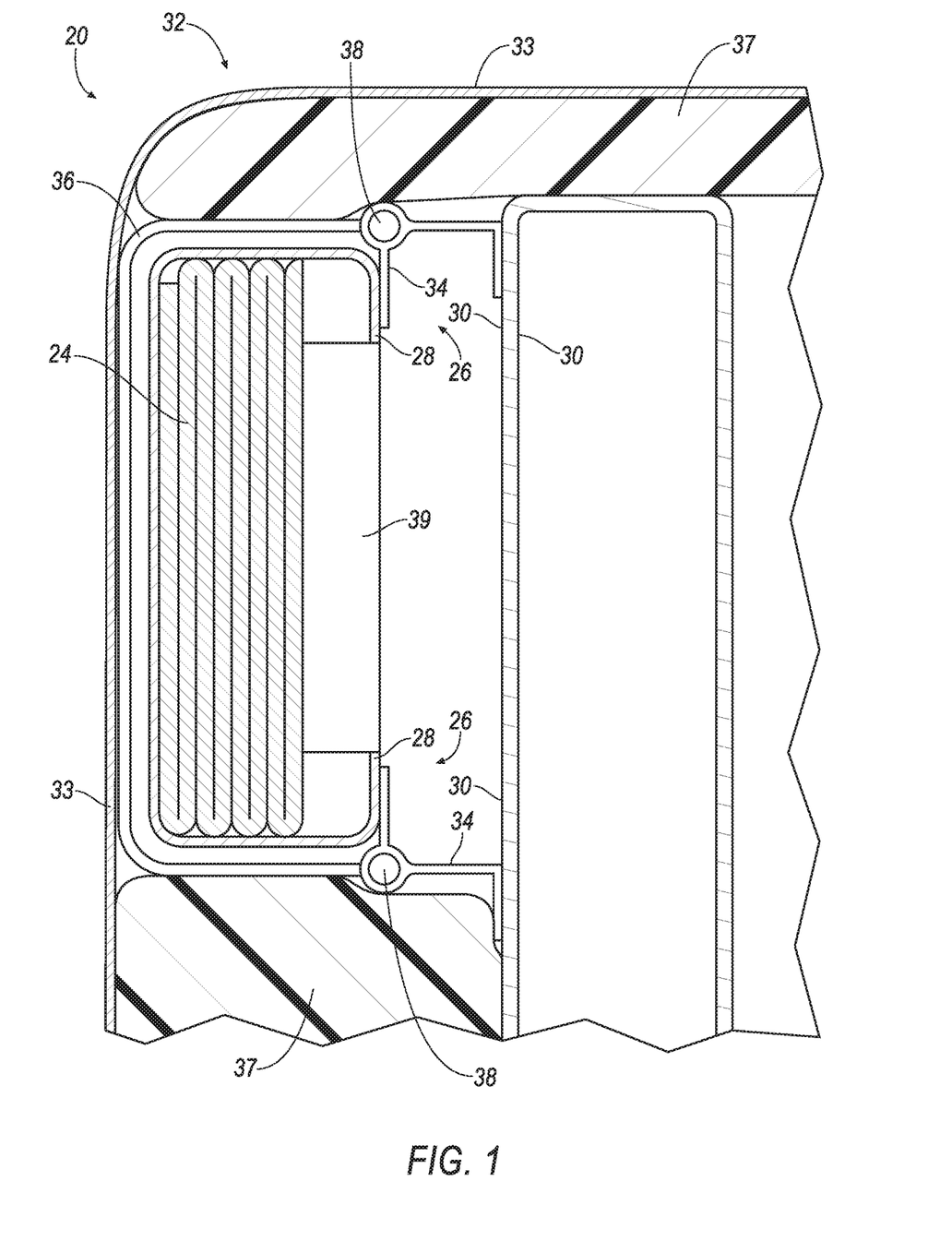
FIG. 1 is a cross section of a vehicle seat having an airbag assembly secured with a linchpin.
Figure 2:
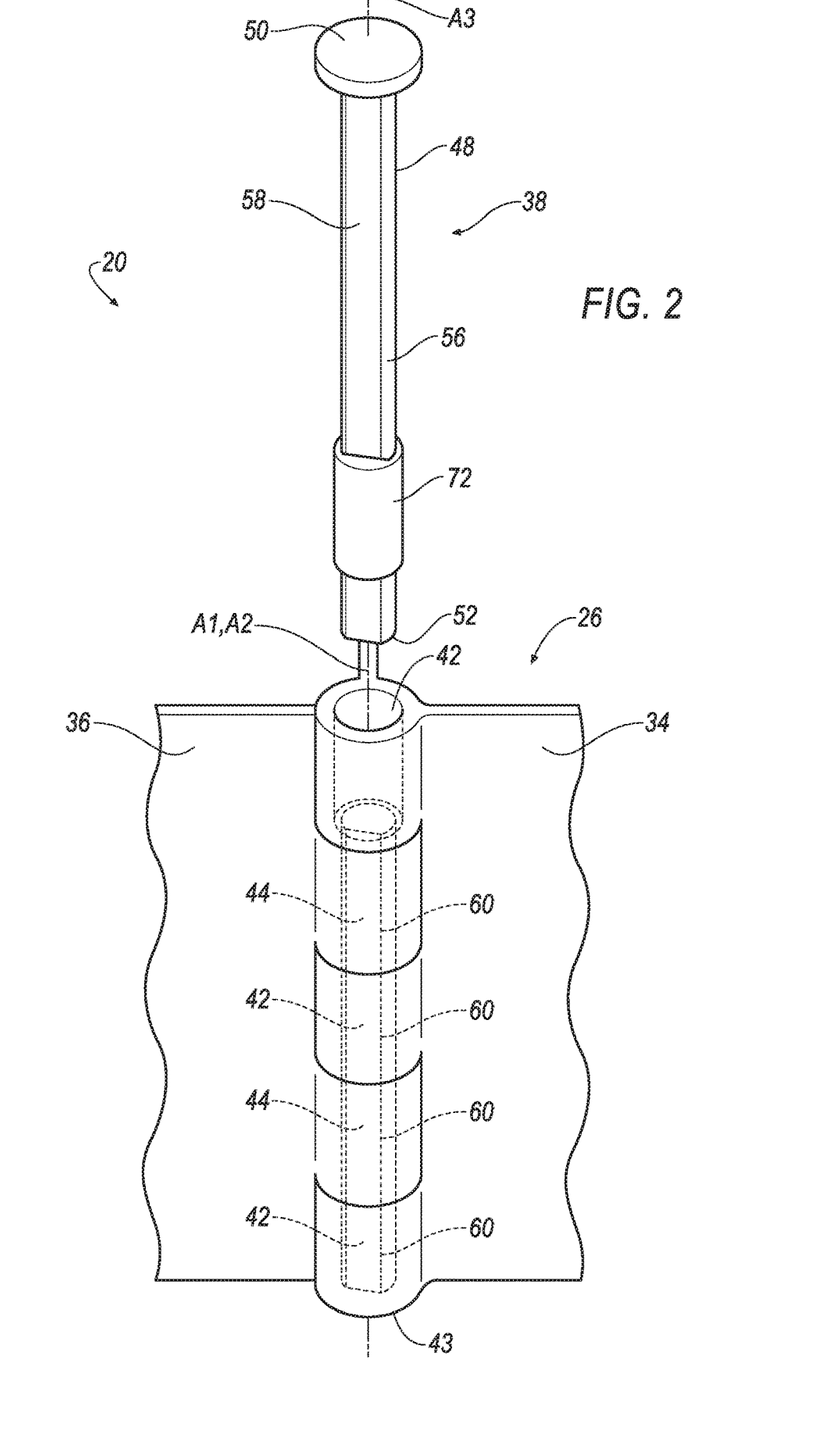
FIG. 2 is a perspective view of a portion of the airbag assembly and the linchpin prior to installation.
Figure 3:
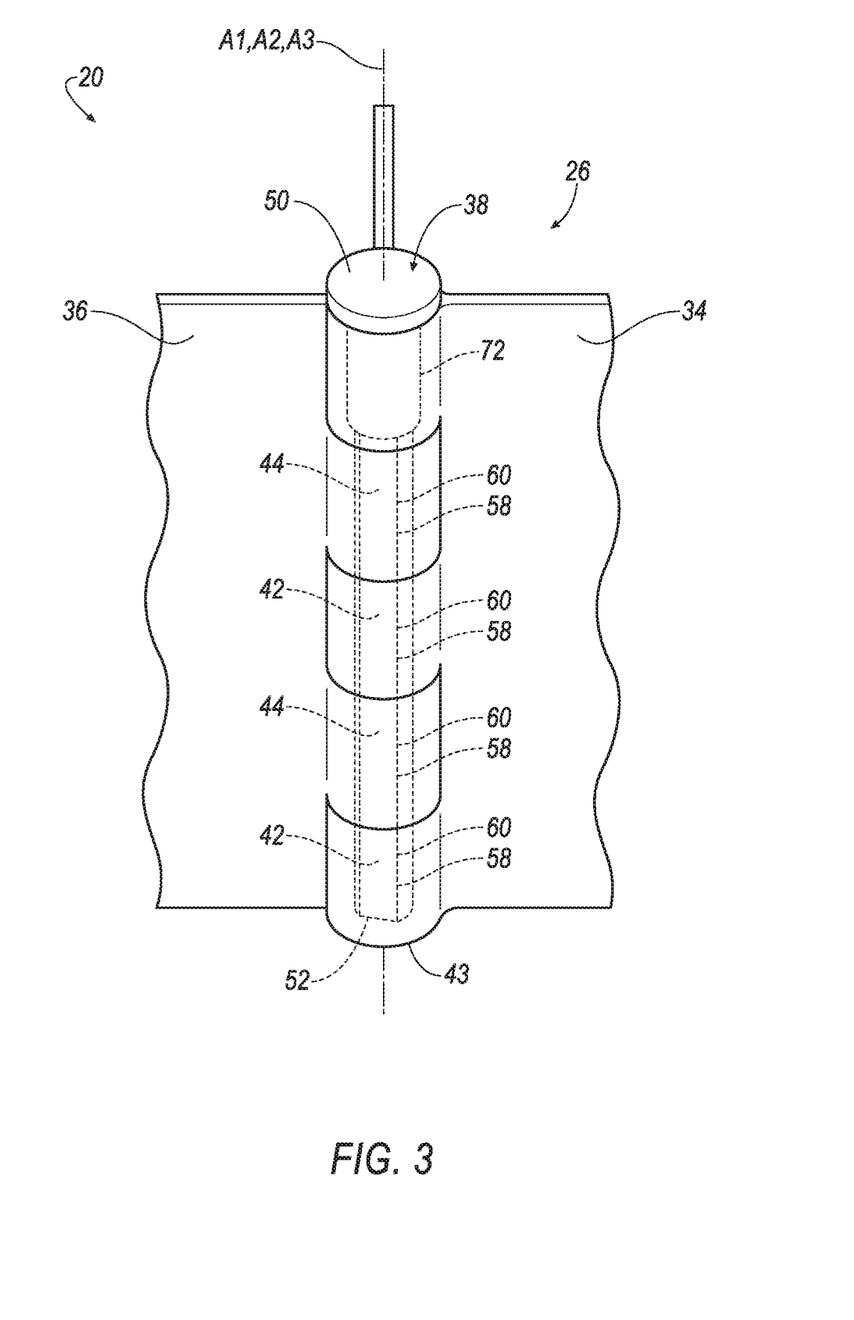
FIG. 3 is a perspective view of the portion of the airbag assembly and the linchpin after installation.
Figure 4:
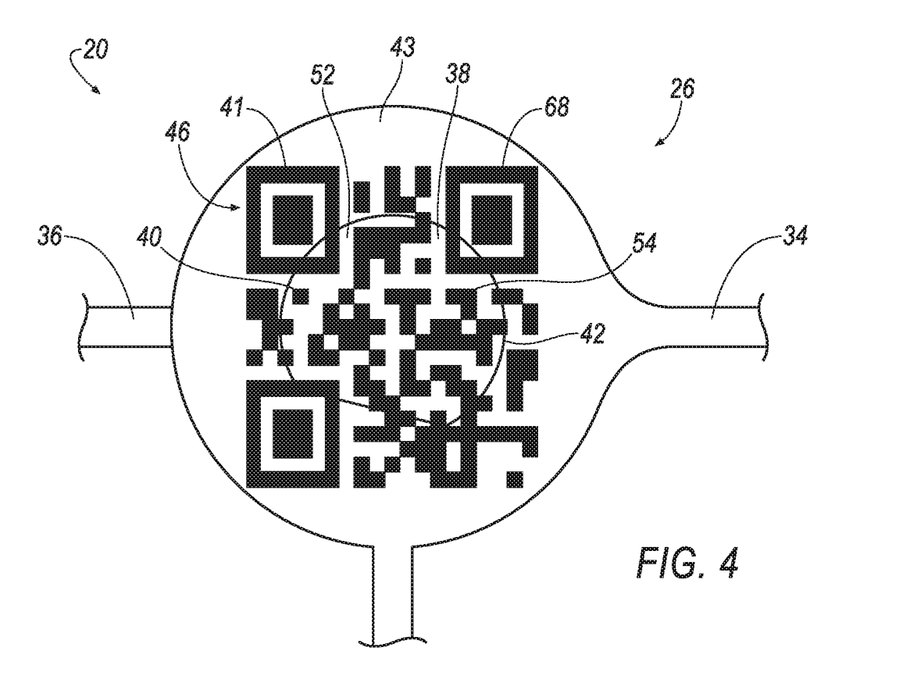
FIG. 4 is a bottom view of the portion of the airbag assembly and the linchpin after installation.
Figure 5:
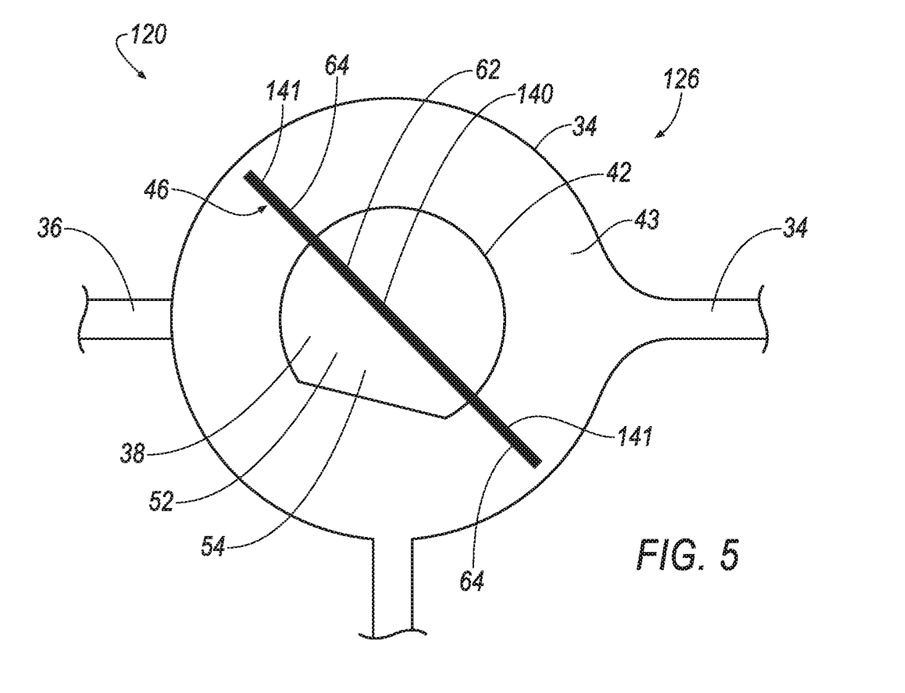
FIG. 5 is a bottom view of a portion of another embodiment of an airbag assembly and a linchpin after installation.

With reference to the embodiments shown in FIGS. 4 and 5, the marking 40, 140 may be on the surface 54 of the distal end 52 of the linchpin 38, and the marking 41, 141 may be on an end of the base 26, 126 and/or airbag guide 36.

For example, as shown in the embodiment in FIG. 4, the marking 40 may be a portion of the barcode 68, and the marking 41 may be another portion of the barcode 68. The markings 40, 41 may collectively be the barcode 68 as the readable indium 46 when the linchpin 38 is properly inserted.

As another, as shown in the embodiment shown in FIG. 5, the marking 141 of the base 126 and/or the airbag guide 36 may include one more lines 64. The lines 64 may be spaced from each other. The lines 64 may be parallel and aligned with each other. The lines 64 may be on an end of the base 126 and/or airbag guide 36 with one of the passages 42, 44 therebetween. The marking 140 of the linchpin 38 may include a line 62. The readable indicium 46 may include the line 62 of the marking 140 of the linchpin 38 and the lines 64 the marking 141 of the base 126 and/or airbag guide 36. The readable indicium 46 may include the lines 62, 64 all being parallel to each other. The readable indicium 46 may include the line 62 of the marking 140 of the linchpin 38 being between the lines 64 the marking 141 of the base 126 and/or airbag guide 36.

With reference to the embodiment shown in FIGS. 6 and 7, the marking 240 may be on the circumferential surface 56 of the linchpin 38, e.g., on the alignment surface 58. The marking 241 of the airbag guide 36 and/or of the base 226 may define a window 70. The window 70 may provide access to one of the passages 42 perpendicular to the respective axis. The readable indicium 46 may include the marking 240 of the linchpin 38 being located in the window 70 of the marking 241 of the base 226 and/or airbag guide 36. In other words, the marking 240 of the linchpin 38 may be viewable through the window 70 when the linchpin 38 is properly inserted into the airbag guide 36 and/or base 226. For example, the marking 241 may be the barcode 168. The barcode 168 may be scannable through the window 70 when the linchpin 38 is properly inserted. As another example, the marking 240 may include a line, and the marking 241 may include one or more lines at opposite sides of the window 70, the markings 240, 241 aligning when the linchpin 38 is properly inserted, e.g., with the line of the marking 240 between the lines of the marking 241 (not shown).

Returning to the embodiments shown throughout the Figures, the airbag assembly 20, 120, 220 may include a sleeve 72. The sleeve 72 may surround the shaft 48. The sleeve 72 may be slidable along the linchpin 38, e.g., along the shaft 48 between the distal end 52 and the head 50. The sleeve 72 may be disposed between the linchpin 38 and one of the base 26, 126, 226 or the airbag guide 36, e.g., in one of the passages 42, 44. The sleeve 72 aids in verifying proper assembly of the airbag assembly 20, 120, 220. For example, one of the passages 42, 44 at an end of the base 26, 126, 226 or the airbag guide 36 may be larger than the other passages 42, 44 and the sleeve 72 may be sized to only fit in the larger passage, e.g., preventing the linchpin 38 and the sleeve 72 from being fully inserted into the passages 42, 44 if the linchpin 38 is inserted opposite the larger passage.

Figure 8:
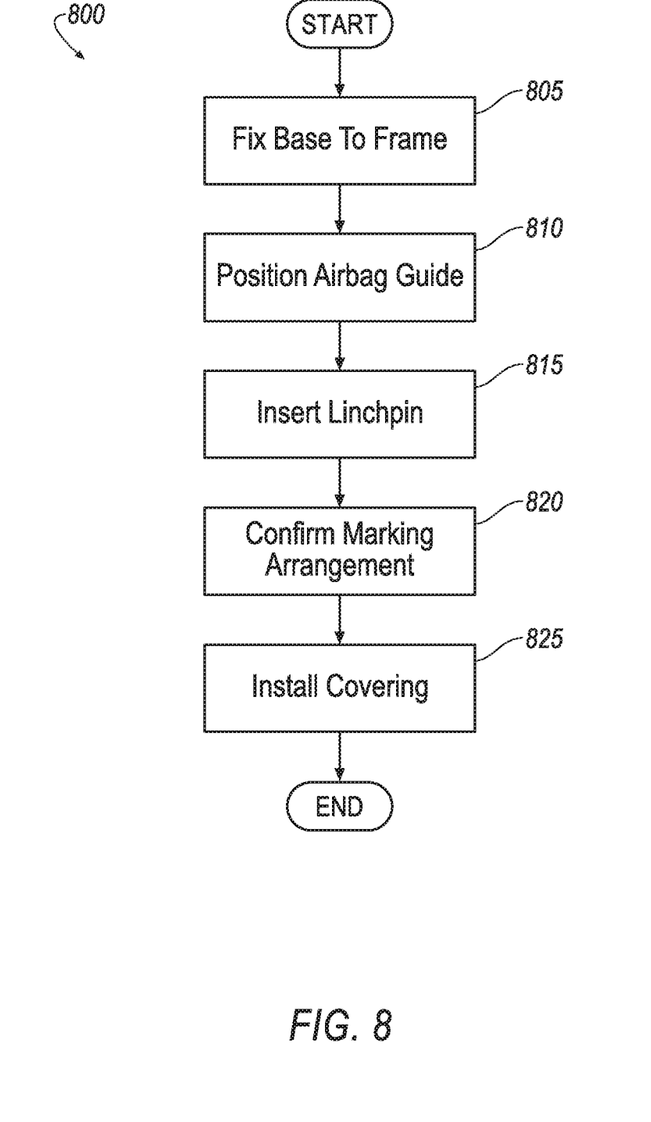
FIG. 8 is a flow chart illustrating a process of verifying linchpin installation.

FIG. 8 is a flow chart illustrating an exemplary process 800 for installing the airbag assembly 20, 120, 220.

The process 800 begins in a block 805 by fixing the base 26, 126, 226 to the frame 30 of the seat 32. For example, a human or robot may install fasteners, welds, etc., to fix the bracket 34 to the frame 30. The housing 28 may also be fixed to the bracket 34.

Next, at a block 810 the process 800 continues with positioning the airbag guide 36 relative to the base 26, 126, 226. For example, a human and/or robot may align the passages 44 of the airbag guide 36 with the passages 42 of the bracket 34.

Next, at a block 815 the process 800 continues with inserting the linchpin 38 to fix the airbag guide 36 to the base 26, 126, 226. For example, a human and/or robot may insert the linchpin 38 into the passages 42, 44.

Next, at a block 820 the process 800 continues with confirming the marking 40, 140, 240 of the linchpin 38 is aligned with the marking 41, 141, 241 of the base 26, 126, 226 and/or airbag guide 36 to collectively be the readable indicium 46. For example, a human or robot may confirm the marking 40, 140, 240 of the linchpin 38 is aligned with the marking 41, 141, 241 of the base 26, 126, 226 and/or airbag guide 36 by scanning the barcode 68 as the readable indicium, e.g., with a barcode reader, a camera, etc. As another example, a human or robot may confirm the marking 40, 140, 240 of the linchpin 38 is aligned with the marking 41, 141, 241 of the base 26, 126, 226 and/or airbag guide 36 by confirming the marking 40, 140, 240, e.g., the line 62, of the linchpin 38 is parallel with the marking 41, 141, 241, e.g., line(s) 64, of the base 26, 126, 226 and/or airbag guide 36, e.g., with inspection via the human eye, based on information from a camera, touch sensor, etc. As one more example, a human or robot may confirm the marking 40, 140, 240 of the linchpin 38 is aligned with the marking 41, 141, 241 of the base 26, 126, 226 and/or airbag guide 36 by confirming the marking 40, 140, 240 of the linchpin 38 is within the window 70 defined by the marking 41, 141, 241 of the base 26, 126, 226 and/or airbag guide 36, e.g., with inspection via the human eye, based on information from a camera, touch sensor, bar-code reader, etc. After the block 820 the process 800 may move to the block 825.

Finally, at the block 825 the process 800 continues with installing the covering 33 over the frame 30, base 26, 126, 226, and airbag guide 36. A human or robot may install the covering 33. After the block 825 the process 800 may end.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
a seat frame;
a base fixed to the seat frame;
an airbag supported by the base;
an airbag guide supported by the base;
the base between the airbag guide and the seat frame;
a linchpin securing the airbag guide to the base;
the linchpin including a first marking and one of the base or the airbag guide including a second marking, the first marking and the second marking aligning to collectively be a readable indicium;
a covering that covers the seat frame, the airbag, and the airbag guide; and
the airbag guide between the base and the covering.

2. The assembly of claim 1, wherein the readable indicium is a barcode.

3. The assembly of claim 1, wherein the linchpin includes a circumferential surface, and the first marking is on the circumferential surface.

4. The assembly of claim 1, wherein the linchpin includes a distal end and a surface on the distal end, wherein the first marking is on the surface of the distal end.

5. The assembly of claim 1, wherein the first marking includes a first line, and the second marking includes a second line that is parallel to the first line.

6. The assembly of claim 1, wherein the first marking includes a first line, and the second marking includes a second line and a third line spaced from the second line, the first line being between the second line and the third line.

7. The assembly of claim 6, wherein the first line, the second line, and the third line are parallel.

8. The assembly of claim 1, wherein the linchpin, the base, and the airbag guide each include an alignment surface, the alignment surfaces collectively positioning the linchpin, the base, and the airbag guide relative to each other.

9. The assembly of claim 8, wherein the alignment surface of the linchpin abuts the alignment surfaces of the base and the airbag guide.

10. The assembly of claim 8, wherein the linchpin includes a shaft and the alignment surface of the linchpin is planar and elongated along the shaft.

11. The assembly of claim 1, wherein the readable indicium is visually readable.

12. The assembly of claim 1, further comprising a sleeve separate from the airbag guide and disposed between the linchpin and one of the base or the airbag guide.

13. The assembly of claim 1, further comprising an airbag housing supporting the airbag, the airbag housing fixed to the base.

14. The assembly of claim 13, wherein the airbag guide partially surrounds the airbag housing.

15. A method of installing an airbag assembly, comprising:
fixing a base to a seat frame;
after fixing the base to the seat frame, positioning an airbag guide relative to the base, one of the airbag guide or the base including a first marking;
inserting a linchpin to fix the airbag guide to the base, the linchpin including a second marking; and
confirming the first marking is aligned with the second marking to collectively be a readable indicium.

16. The method of claim 15, wherein confirming the first marking is aligned with the second marking includes scanning a barcode as the readable indicium.

17. The method of claim 15, wherein confirming the first marking is aligned with the second marking includes confirming the first marking is parallel with the second marking.

18. The method of claim 15, wherein confirming the first marking is aligned with the second marking includes confirming the second marking is within a window defined by the first marking.

19. The method of claim 15, further comprising installing a covering over the seat frame, base, and airbag guide after confirming the first marking is aligned with the second marking.

20. An assembly, comprising:
a base;
an airbag supported by the base;
an airbag guide supported by the base;
a linchpin securing the airbag guide to the base; and
the linchpin including a first marking and one of the base or the airbag guide including a second marking, the first marking and the second marking aligning to collectively be a readable indicium, the second marking defining a window, and the first marking located in the window.

* * * * *